Oct. 16, 1956   A. HUET   2,766,513
METHOD OF FABRICATING A TUBULAR ELEMENT
Filed Nov. 24, 1951   3 Sheets-Sheet 3

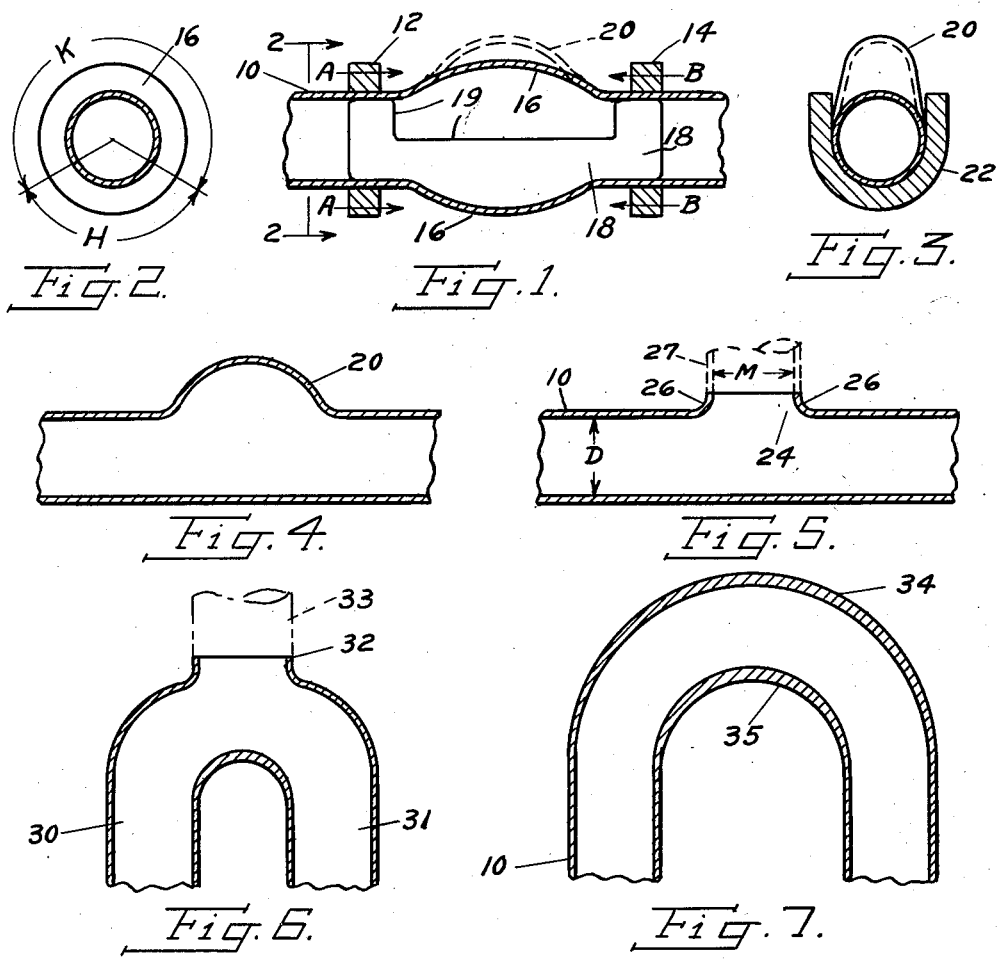

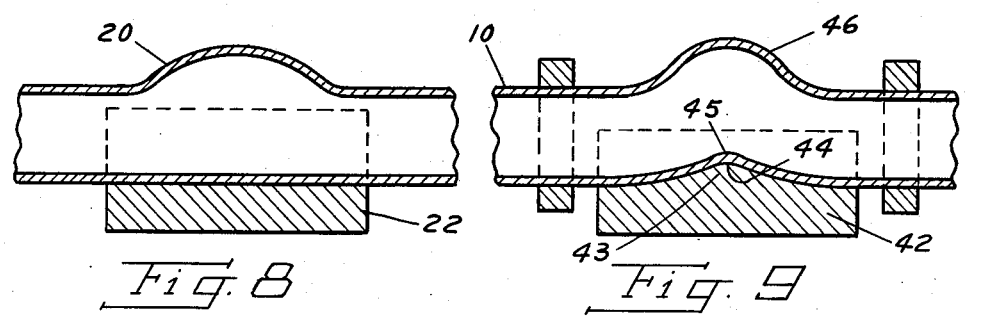
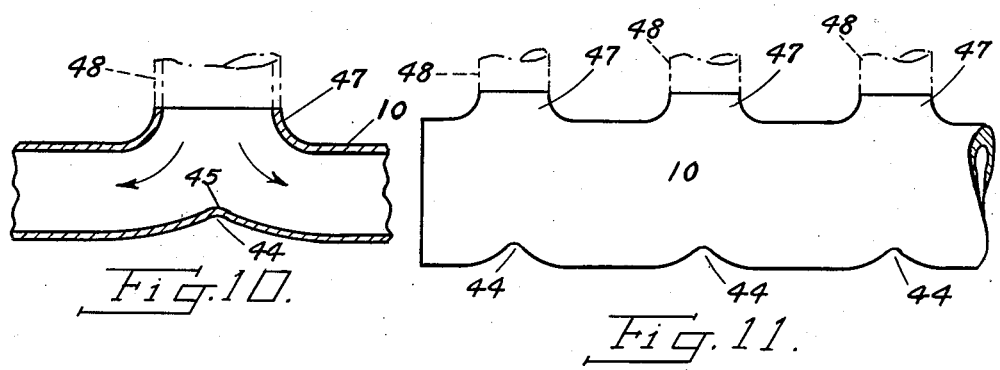
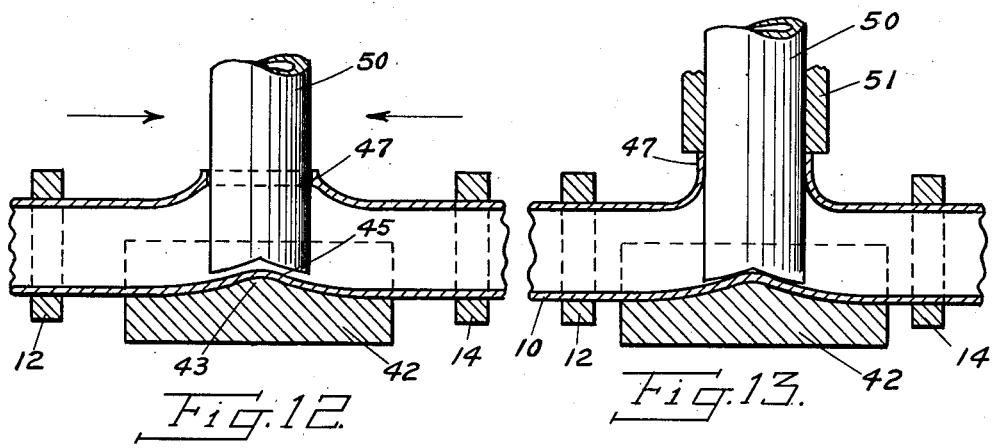

ANDRE HUET
INVENTOR.

BY James J. Whalen
ATTORNEY

United States Patent Office 2,766,513
Patented Oct. 16, 1956

2,766,513

METHOD OF FABRICATING A TUBULAR ELEMENT

André Huet, Paris, France, assignor to Combustion Engineering, Inc., New York, N. Y., a corporation of Delaware Application November 24, 1951, Serial No. 258,060

4 Claims. (Cl. 29—157)

The present invention relates to working or manipulating metallic tubes to form fittings, such as unions like T's, return bends, fluid distributing headers or various other forms.

Fundamentally, the processes of the present invention create (by any suitable method) a heat gradient in the thickness of the wall of the tube at the place which is to be treated and the portions of the tube contiguous to this part are then subjected to compressive forces which tend to upset them so as to form a blister-like circumferential bulge (or bulges) in the location on the tube between the points where the forces are applied.

The invention further contemplates the reduction of a fully circumferential blister or bulge on a tube to an eccentric bulge and its utilization for the formation of various types of tube forms, such as T unions, return bends, bifurcated or Y tubes, fluid distributing headers, and similar forms and other fittings. In general this involves, according to the present invention, the altering of a tube section to create a bulge or bulb, without notably increasing the thickness of the wall of the tube. By a tube with eccentric bulge is meant a tube part of which is swollen in the shape of a blaster the axis of this eccentric bulge not coinciding with that of the tube, that is, the bulge affects only one sector of the cylindrical wall of the tube.

According to this aspect of this invention a centered bulge is first produced, for example, by pressing part of the tube back onto itself; after this, by a suitable pressing or stamping; for example, the eccentricity of this bulge is produced by restoring a sector of the bulged tube to the general cylindrical form of the original tube section. During this operation part of the material of the tube flows from one sector of the bulge in the tube to the opposite sector without notably increasing the thickness of the tube on the opposite bulged sector. It is then possible to utilize this displaced material to obtain various tubular forms or fittings. In particular, the eccentric bulge may be opened so as to permit joining another tube to the straight tube section in order to obtain a T tube.

A tube with eccentric bulge or increased wall on one side may, according to the invention, also be bent into a return bend. If the bulge of the elbow is opened a bifurcate may be formed by joining on another tube directed in a direction the reverse of that of the arms of the elbow bend.

The order of the operations which have been described above and later herein is not mandatory. In particular, the pressing back of the eccentric bulge may take place before the bending of the tube to elbow or return bend form. The bulge could even be produced on a tube already previously bent with a view to effecting on the bend, either a joint by opening the bulge, or an increased thickness of the wall in the outer region of the bend.

Figure 1 is a longitudinal section and Figure 2 a transverse section of a tube having a circumferential bulge or "blister" produced in accordance with the present invention.

Figure 3 is a section on line 2—2 of Fig. 1 showing use of a stamping die according to the invention for obtaining an "eccentric bulge."

Figure 4 is a longitudinal section of the tube with eccentric bulge.

Figure 5 is similar to Fig. 3 after opening of the bulge to make a neck for connection of another tube so as to form a T-junction.

Figure 6 is a longitudinal section of an elbow or 180° bend with its parallel tube branches brought nearly together with the opened bulge utilized for the connection of another tube to create a bifurcated or Y tube.

Figure 7 is a longitudinal section of an 180° bend with outer wall reinforced by flattening out the eccentric bulge formed in accordance with the invention.

Figure 8 is a view similar to Fig. 4 of an axial section of a tube with an eccentrically bulged portion formed as in Figs. 1 to 3.

Figure 9 shows an eccentrically bulged tube which has had its circumferential bulge reduced beyond cylindrical shape on one side to create a transverse depression on the outer wall of the tube with corresponding ridge on its inner wall located opposite the now eccentric bulge.

Figure 10 shows the tube of Figure 9 with the eccentric bulge opened and the metal worked to form a neck for a pipe connection.

Figure 11 is a side view of a fluid distributing header formed from a tube length provided with a number of necks for joining pipes in accordance with the invention.

Figures 12 and 13 illustrate the use of a punch and die to facilitate formation of a deflector within the tube opposite a neck provided for welding of another tube.

Figure 14:
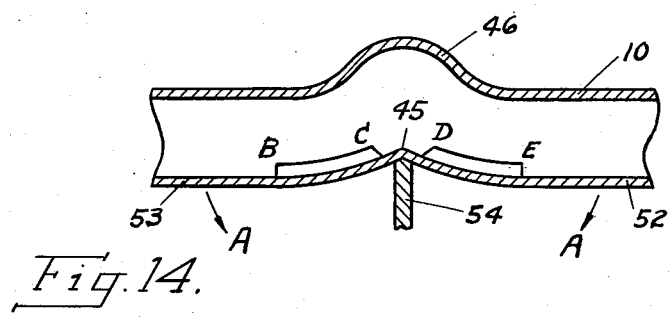
Figure 15:
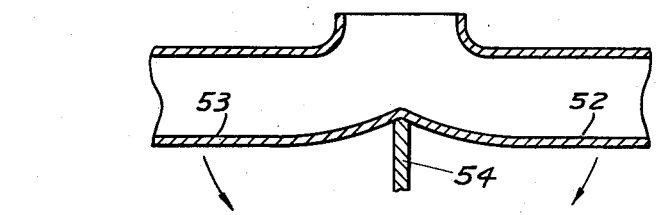

Figures 14 and 15 show bulged tube similar to those of Figs. 4 and 5 preliminary to bending to form 180° return bends.

Figure 16:
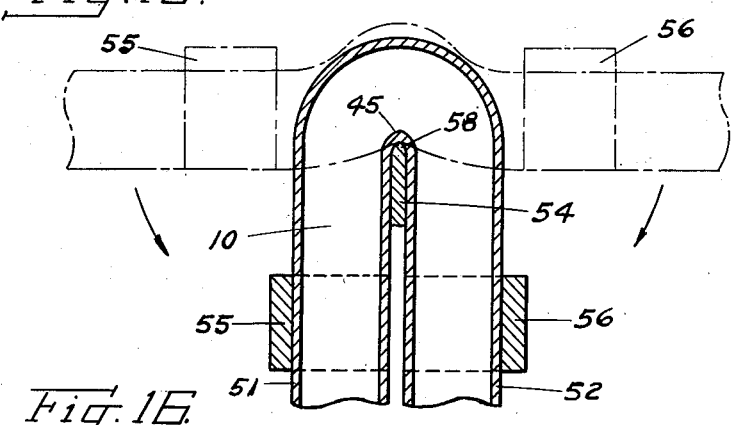
Figure 17:
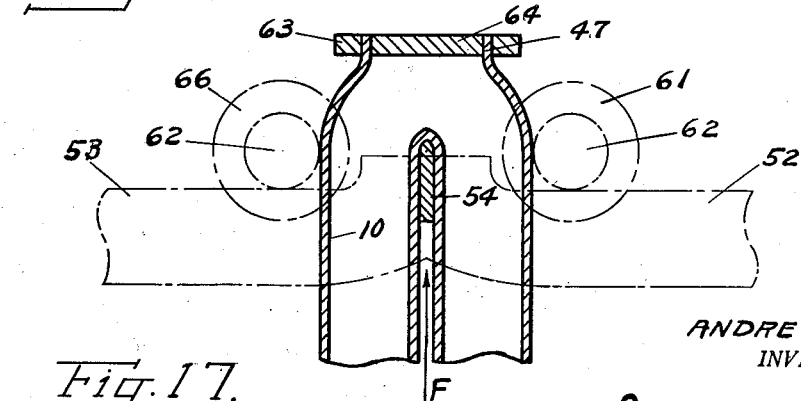

Figures 16 and 17 illustrate the tube of Figs. 14 and 15 after bending.

As may be seen in Fig. 1, the portion of the tube 10 which it is desired to treat or alter according to the invention is grasped at axially spaced points located between its ends by the two relatively movable clamping rings or jaws 12, 14 which, for example, are part of a resistance heating mechanism and this portion of the tube is brought throughout the entire circumference to a fixed degree of heating by the passage of electric current through the tube 10 from ring 12 to ring 14. Other methods of heating the portion of the tube in question may be employed. If the tube is heated to a cherry red temperature and the two rings 12, 14 brought together in the direction of arrows A and B a tube is obtained with its wall circumferentially bulged at 16, perfectly symmetrically, the wall of the tube remaining constant in thickness over the entire portion treated.

To create a tubular fitting or part, such as a T or Y union or an elbow or return bend, a bulge or bulb is formed between selected points of a tube length in accordance with the method described above. The bulge 16 thus obtained is heated and the metal of this bulge is pressed back on a certain sector H, Fig. 2, so as to obtain an eccentric bulge 20 as shown by the broken lines in Fig. 1 and in elevation in Fig. 3. This operation may be carried out in various ways; for example, after the optional introduction inside of the tube 10 of a punch or mandrel 18 preferably hollowed out at 19 as shown in Fig. 1 the tube is put in a die 22 (Fig. 3) having a groove or recess in the shape of a semi-cylindrical channel. The die 22 may be separated by a layer of asbestos from the wall of the tube, or the die may be of suitable metal and preheated. Instead of a stamping operation, the sector H of the tube may be brought back to cylindrical or semi-cylindrical contour by a rolling operation. The sectorial portion H of the tube is restored to a cylindrical profile, without the thickness of the tube in this area being increased whereas the material of the lower part of bulge 16 is pressed back into sector K accentuating asymmetrically the swelling of the bulge as shown at 20 in Figures 3 and 4 and there again, without there being any notable increase in the wall thickness of the tube in the bulbous region. Thus, there is obtained a tube with eccentric bulge 20 such as is shown in longitudinal section in Fig. 4.

Owing to the displacement of material of the sector H of the tube toward the opposite sector K, extra material is available that makes it possible to make various forms of tubular elements which up to the present time have been produced only with difficulty. For example, by opening the eccentric bulge 20 and raising up the edges of the opening 24, one may make, as shown in Fig. 5, a neck 26 which makes it possible to weld a length 27 of tube 10 in order to make a T union. The diameter M of the opening 24 of the neck 27 may be greater than the bore D of the straight tube length 10 since there is an excess of material available at this spot and the bulges may be opened wider than the non-modified wall of a cylindrical tube could be. Such a result could not be secured if one simply raised a neck on the wall of a cylindrical tube which had not previously been bulged to provide the requisite metal for the greater diameter of the annulus forming the neck 27.

An inlet or outlet header for distribution of fluid in a heat exchanger may be made as shown in Fig. 13 by forming a plurality of bulges and resultant neck portions 47 on a tube, to each of which necks a fluid circulation tube 48 may be connected.

The tube 10 with the eccentric bulge 20 may be bent into an 180° return bend such as shown in Fig. 6. As in Fig. 5, the bulge 20 may be opened so that when the tube is bent to provide parallel legs 30, 31, neck connection 32 thus makes it possible to weld on a tube length 33 to obtain a bifurcated tube or Y shape.

When the tube is bent the part of the increased wall thickness creates in the outer region of the bend an increased thickness such as 34, Fig. 7. This thickness may even be greater than the increased thickness 35 of the crotch of the below bend which results from compression in bending the tube. As has been stated, the order of the various operation is not imperative.

Heretofore, when one wished to make a neck on a tube or pipe, that is, a joint which makes it possible to attach another tube onto the first tube, conventional processes required cutting an opening out of the cylindrical wall of the tube and then of welding an annular neck or joint into this opening. Such welding presents disadvantages in operation. The present invention which makes it possible to produce necks without welding is particularly advantageous for a tube which may have multiple necks at the same level, the whole forming a unitary integral mass without welding, and the diameters of the necks, or joints, can be equal to or greater than the diameter of the tube on which they are made.

Instead of pressing or stamping the central bulge 16 of a tube 10 (Fig. 1) back to fully cylindrical shape on one side as in Figures 3, 4 and 8 some of the metal may be pushed back beyond the cylindrical wall of the tube itself as shown in Figure 9. This produces a recession of material, i. e., a depression, in the tube wall on the side opposite the off-centered bulge and the interior wall consequently has a projection that constitutes a deflector which assures a better flow of the fluid inside of the tube.

As in Fig. 1, a preliminary step forms on the tube a centered bulge by pushing the tube material back onto itself, axially. Ordinarily the bulge is offcentered, as may be seen in Figure 8, with the aid of a semi-cylindrical die 22 which fits onto the lower sector of the bulge 16 of Fig. 1 and pushes back the material of this part of the bulge into the opposite sector, giving to the eccentric bulge 20 a greater size than that of the centered bulge previously produced.

Instead of using the die 22 the base of which is cylindrical and which corresponds to the section of the tube 10, another die 42 (Fig. 9 which has a transverse ridge 43 may be initially used to push back the metal of the lower sector beyond the original cylindrical wall of the tube while also creating a fold or depression 44 in the lower outer wall surface and resulting in a projection 45 into the bore of the tube section; this further causes an accentuated pushing back of material into the off centered bulge 46, which is then larger than a bulge 20 formed as in Fig. 8. This stamping operation can be carried out in one or several steps, if desired with appropriate heating of certain portions of the tube 10.

Thus, there is available an additional quantity of material on the side of the off-centered bulge 46 to form the neck 47 shown in Figure 10 to which there may be welded a straight tube 48 in order to produce a T-joint. The projection 45 has the additional advantage as may be seen in Figure 10 of providing inside of the connection a deflector to assure better flow of the fluid between the connection 48 and the two legs of the tube 10. As mentioned above, by forming a plurality of necks 47 on a tube, there is created a fluid collecting or distributing header (Fig. 11) which has a series of connections 48.

According to an alternative process, after suitable heating of the region which is to be treated, a cylindrical tube is forced into a die having a transverse ridge such as at 43 in die 42 so that after stamping there is formed a projection 45 on the inner wall of the tube, at the same time as, in the wall opposite there is obtained a displacement of material to create an embryo eccentric bulge. The two free ends of the tube are then compressed as described above in connection with Fig. 1 and the bulge started by the ridge forming die becomes an enlarged eccentric bulge which can then be opened to form a neck which will make possible the connection of a tube.

It may be preferable to proceed with the opening of the initial bulge before compressing the tube. For this purpose, the bulge 46 can be simply split in a plane, preferably perpendicular to the axis of the tube. In this way one facilitates the formation of the larger eccentric bulge, at the time of compression.

Instead of a simple slit one can also form a neck embryo 47 in the bulge Fig. 12. It is then possible, if desired, to introduce into the opening thus formed a stamp punch 50 which has a double function: on the one hand, it contacts the bottom of the tube in the neighborhood of the ridge 45 in the wall of the tube which rests in the die 42 (Fig. 13) and prevents the wall from excessively increasing in thickness at this place during the compression. On the other hand, the punch 50 makes it possible to gauge the neck 47 which is to be formed, possibly in combination with forming dies which engage the collar of said neck, or owing to a shoulder 51 provided on said punch and forming a stop. Under the effect of the drawing together of the jaws 12, 14 one causes the enlargement of the neck 47 by displacing the pushed back metal along the punch 50 as seen in Figure 13.

A straight tube with eccentric bulge 46 and internal projection 45 such as shown in Fig. 9 is, in effect, like a tube on which a beginning of an 180° bend has already been made. The advantage of making an 180° bend from a tube of this type lies in the fact that the legs of the bend can be made to be almost or entirely in contact and that the bend does not have a notable increased thickness of wall inside its crotch. It is in fact known that a tube bend produced by the ordinary methods, that is, by rolling the tube on a bending disk, always has a more or less notable increased thickness of wall in the crotch of the bend. When, additionally, one uses compressing methods as in application Serial No. 92,994 filed May 13, 1949 for bringing together the legs of the bend and to diminish the distance between tube axes, one further increases the already increased thickness of the middle region of the bend. Bends made according to the present invention and even with legs being almost or entirely in contact are, on the contrary, distinguished by their slight increased thickness in the inside region.

The neck bends produced according to the process which is the subject of the invention have the advantage that their necks can be of larger diameter than that of the necks made afterward in ordinary bends. In fact that necks according to the invention can exceed 1.3 of the diameter of the initial straight tube, evaluated at 1, and even attain 1.6 and 1.8 of this diameter.

As may be seen on Figure 14 starting with a straight tube 10 with eccentric bulge 46 and projection 45 in the opposite wall produced as described above, it is necessary only to fold back the two legs 52, 53 of this straight tube in the direction of the arrows A, on both sides of the projection 45, in order to produce a tube bent to 180°, or a lesser angle. For this purpose according to the present invention, the projection 45 is supported by an anvil or fulcrum 54 and the regions BC, DE of the tube are heated, as well as if desired regions which will be at the outside of the elbow, on the side of the eccentric bulge 46. The folding back of the straight legs of the straight bend is produced by any suitable means. For example, as seen in Figure 15, the tube being in the starting position shown by the dotted lines, jaws shown indicated at 55, 56, are applied on these legs and are, by rotation in the direction of arrows A, brought into the position shown by the solid lines. This produces the 180° bend shown in Fig. 15 which does not have any appreciable increased thickness in the internal crotch region 58.

The folding back of the legs could be produced by other means; for example, by means of disks applied on the straight legs 52, 53 of the tube 10 with a conventional bending machine having a grooved roller around which the bend is shaped. Alternatively, the central part of the tube 10 may be forced between disks 60, 61 with fixed axes 62 as shown in dotted lines on Fig. 16. In this figure it has been assumed that the making of the bend was applied to a tube with neck 47 as shown in Fig. 10. The neck 47 is kept between the dies 63, 64 so as not to be deformed, whereas the plunger 54 which serves as a bending fulcrum is pushed in the direction of the arrow F. In this way, the legs of the tube 10 pass between the discs 60, 61 on fixed axes which causes the legs to be folded back, and then come into the position shown in solid lines on Fig. 17, directly giving an 180° bend with a neck 47 at the end or elbow. The neck 47 of such a bend can attain and exceed 1.3 of the diameter of the tube 10 evaluated at 1.

It is also contemplated that the bending operation shown in Fig. 15 may be effected on a straight tube with eccentric bulge 6 such as shown in Fig. 9, while before or during the bending properly so called shown in Fig. 15, a slit is made in the bulge 46 which will become widened during the course of the bending operation, and which will cause the beginning of a neck such as 47 which can be made of desired caliber when the final bend is produced.

This application is a continuation-in-part of that filed in my name under Serial No. 233,358 on June 25, 1951.

What I claim is:

1. The method of fabricating a tubular element comprising; heating the entire circumference of an empty metallic tube over a determined portion of its length located between the ends thereof; grasping the empty tube outwardly of said heated portion at spaced points located between its ends and applying from said spaced points on the tube compressive forces acting in directions toward each other to shorten the length of the tube between said points while increasing the tube diameter to form a blister-like bulge therein extending completely around the circumference of the tube; restoring a determined sector of the bulged portion of the tube to cylindrical form to create an eccentric bulge at the heated portion while working metal from said sector into the remainder of the bulged portion of the tube to enlarge the eccentric portion of said bulge; forming a recession in the exterior wall of the tube in a location opposite said eccentric bulge so as to displace metal from said location into the bulged portion of the tube; forming an opening in said bulge; and working the tube metal bounding said opening to create from said bulge a neck-like portion on said tube.

2. The method of fabricating a tubular element comprising; heating the entire circumference of an empty metallic tube over a determined portion of its length located between the ends thereof; grasping the tube outwardly of said heated portion at spaced points between its ends and applying from said points compressive forces acting in directions toward each other to shorten the length of the tube between said points while increasing the tube diameter to form a blister-like bulge therein extending completely around the circumference of the tube at the heated portion; restoring a determined sector of the bulged portion of the tube to cylindrical form to create an eccentric bulge while working metal from said sector into the remainder of the bulged portion of the tube to enlarge the eccentric portion of said bulge; forming a recession in the exterior wall of the tube in a location opposite said opening so as to displace metal from said location into the bulged portion of the tube by applying a die to the external wall of the tube opposite said opening; forming an opening in said bulge; heating the bulged portion of said tube; introducing a punch and gauging die through said opening to form a neck portion about the opening; and simultaneously with the introduction of said punch and gauging die into the neck of said tube grasping the tube at longitudinally spaced points at either side of the eccentric bulge and applying from said points compressive forces acting in directions toward each other to further shorten said tube and displace the material of said bulge around said opening against said punch therein and outwardly along said punch to enlarge said neck portion.

3. The method of fabricating a tubular element comprising; heating the entire circumference of an empty metallic tube over a determined portion of its length located between the ends thereof; grasping the tube outwardly of said heated portion at spaced points between its ends and applying from said points compressive forces acting in directions toward each other to shorten the length of the tube between said points while increasing the tube diameter to form a blister-like bulge therein extending completely around the circumference of the tube at the heated portion; restoring a determined sector of the bulged portion of the tube to cylindrical form to create an eccentric bulge while working metal from said sector into the remainder of the bulged portion of the tube to enlarge the eccentric portion of said bulge; forming a recession in the exterior wall of the tube in a location opposite said opening so as to displace metal from said location into the bulged portion of the tube by applying a die to the external wall of the tube opposite said opening; forming an opening in said bulge; heating the bulged portion of said tube; introducing a punch and gauging die through said opening to form a neck portion about the opening; simultaneously with the introduction of said punch and gauging die into the neck of said tube grasping the tube at longitudinally spaced points at either side of the eccentric bulge and applying from said points compressive forces acting in directions toward each other to further shorten said tube and displace the material of said bulge around said opening against said punch therein and outwardly along said punch to enlarge said neck portion; and simultaneously with the introduction of said punch applying a die against the tube wall portion opposite said opening for cooperation with the end of said punch to gauge the thickness of said wall portion.

4. The method of manufacturing a unitary fluid distributing header from a metallic tube which comprises: forming at each point along the tube at which a branch pipe is to be connected a circumferential bulge of greater diameter than the tube by forcing the metallic wall of the tube back upon itself by grasping between its ends the tube at intervals spaced at both sides of each of said points and applying compressive forces in directions toward each other from points spaced at either side of each location at which a branch tube is to be connected; creating eccentric bulges at each point of pipe connection by restoring a determined sectorial portion of the bulged tube wall opposite each point of pipe connection to cylindrical form while working the metal thereof around the tube into the bulged portions at the points of pipe connection to increase the size thereof; forming a depression or dimple-like concavity in the wall portion of the tube opposite each eccentric bulge and thereby creating a projection into the bore of the tube opposite said bulge to serve as a fluid deflecting baffle; forming openings in each eccentric bulged portion of the tube and raising the metal bounding the peripheral edges of the openings into annular rings forming necks; and joining branch pipes to said neck portions.

References Cited in the file of this patent

UNITED STATES PATENTS

| | | |
|---|---|---|
| 720,989 | Williams | Feb. 17, 1903 |
| 1,046,138 | Babbitt | Dec. 3, 1912 |
| 1,430,856 | Slick | Oct. 3, 1922 |
| 1,479,279 | Broido | Jan. 1, 1924 |
| 1,775,331 | Trainer | Sept. 9, 1930 |
| 1,817,854 | Sorenson | Aug. 4, 1931 |
| 1,897,320 | McKnight | Feb. 14, 1933 |
| 1,938,692 | Frank | Dec. 12, 1933 |
| 2,240,319 | Taylor | Apr. 29, 1941 |

FOREIGN PATENTS

| | | |
|---|---|---|
| 171,780 | Germany | May 15, 1904 |
| 339,903 | Germany | Aug. 18, 1921 |
| 579,190 | France | Oct. 11, 1924 |
| 767,266 | France | July 13, 1934 |